Patented Jan. 10, 1950

2,494,257

UNITED STATES PATENT OFFICE 2,494,257

RECOVERY OF CHERRY JUICE OR SYRUP FROM CHERRY BRINE

Gordon B. Nickol, Cincinnati, Ohio, assignor to National Distillers Products Corp., a corporation of Virginia No Drawing. Application July 14, 1948, Serial No. 38,738

3 Claims. (Cl. 99—155)

The present invention relates to a novel method for the recovery of a natural cherry flavored juice or syrup from the brine from cherries preserved in sulfur dioxide lime brine.

In the preparation of cherries preserved in sulfur dioxide lime brine the cherries, usually gathered just before they have fully matured, are packed into paraffin-lined barrels which are then filled with a brine consisting conventionally of about 0.5 to 1.7% sulfur dioxide and 0.4 to 1.2% lime. The cherries are ready for further processing after about 4 to 6 weeks' storage. At this time the bleached, hardened cherries are removed from the brine and, after possible stemming, pitting, and grading, are washed to remove the sulfur dioxide preliminary to further processing.

Up to the present time it has been customary to discard the brine from which the cherries were removed, thus losing the flavor, acid and sugar constituents contained therein. The extent of this loss can be better appreciated when it is borne in mind that this discarded cherry brine contains about 7.5 to 11% soluble solids including 4.75 to 6.5% sugar, with a total acidity expressed as about 1% malic acid. While it has been suggested to render this discarded brine useful by boiling off the sulfur dioxide contained therein, this method is impracticable due to the persistent foaming caused by the calcium salts and the fact that the sulfur dioxide is in combination with the calcium present. Up to the present time no economical, practicably feasible method has been known for the removal of the sulfur dioxide and calcium salts from the cherry brine, while leaving therein the valuable natural cherry constituents.

I have now discovered that a palatable juice containing these natural cherry flavor, acid and sugar constituents can be recovered from the cherry brine by subjecting said brine to treatment with solid, water-insoluble cation exchange material of the hydrogen ion type, thus removing the troublesome calcium ions, and thereupon expelling the sulfur dioxide from the thus-treated brine by boiling at atmospheric or reduced pressure, or by surface evaporation at any given temperature or pressure. The product thus obtained can be directly used, possibly with the addition of sugar, as a palatable natural cherry flavored beverage or concentrated to a cherry syrup. Alternatively, it may be added to the washed, barrelled cherries, from the brine of which it has been recovered, for the preparation of maraschino or candied cherries, in accordance with the method described in my copending application, Serial No. 38,739, entitled "Processing cherries preserved in sulfur dioxide lime brine" of even filing date herewith. The saving in sugar and in natural cherry flavor hereby made possible is considerable.

The processing of the brine in accordance with my invention may be carried out by adding small portions of a solid, water-insoluble hydrogen ion exchange material to a batch of cherry brine, preferably with agitation to promote thorough contact of the added exchange material with said brine, and continuing the addition of small portions of the exchange material until substantially all of the calcium ions have been removed from the solution.

The calcium having thus been removed, the sulfur dioxide can now be readily expelled by boiling. Boiling the cation exchange treated brine for ten minutes at atmospheric pressure will suffice to reduce the residual sulfur dioxide content to a point at which it is no longer objectionable, for example to less than 350 P. P. M. If it is desired to prepare a product which is somewhat less tart than that resulting in accordance with the above described method, the cation exchange treated brine may be blended with a portion of brine which has not been subjected to cation exchange treatment, prior to the sulfur dioxide removal. A blend consisting of 60% treated brine and 40% untreated brine will give a product of good palatable flavor and of a sulfur dioxide content of less than 350 P. P. M. Alternatively, the extent of the calcium removal by the hydrogen ion exchange treatment may be only such as to result in a treated brine of a pH of about 1.5–3.0. The final result of the calcium ion removal and the vaporization of the sulfur dioxide is a brine with a pH of not exceeding 4, and preferably 3–4.

Obviously the above two batch treatments may also be carried out in continuous operation. Thus, the brine from the barrelled cherries may be flowed through a column containing the aforementioned hydrogen ion exchange material, from which it passes into a boiler in which it is heated at the boiling point for a suitable period of time, for instance 10 minutes. Alternatively, the treated brine flowing from the cation exchange column may subsequently pass through vented, heated coils or troughs wherein the sulfur dioxide is expelled by surface evaporation. As a further alternative the heated brine may be atomized into an evacuated chamber.

By the method of my invention substantially all the lime and sulfur dioxide has been removed from the cherry brine, affording an aqueous solution containing the natural cherry acid and sugar constituents and having a natural cherry flavor. This solution may be added directly to washed, preserved cherries, possibly with the addition of a preservative such as sodium benzoate and if desired added sugar and flavoring material, for the preparation of maraschino cherries. Similarly it may be used, with or without the addition of sugar, as a palatable, wholesome cherry drink, or concentrated to syrup form. Whatever the use to be made of it, it is obvious that by the method of my invention a valuable, useful product has been obtained from a brine which heretofore had to be discarded as a valueless waste product.

Following are a few specific examples of the method of my invention as carried out on a calcium sulfur dioxide cherry brine of the following composition:

| | | |
|---|---|---|
| Total $SO_2$ | P. P. M. | 5696 |
| Free $SO_2$ | P. P. M. | 4586 |
| Combined $SO_2$ | P. P. M. | 1110 |
| CaO | per cent | 0.398 |
| Sugar | do | 6 |
| Acidity as malic acid | do | 1.11 |

The resin column mentioned in the following examples was a glass cylinder 3¾" in diameter and 24" long, containing 165 cubic inches of wet Amberlite IR–100H resin.

For comparison purposes it should be pointed out that a portion of the above described brine, which was filtered and then boiled at atmospheric pressure for 10 minutes without intermediate ion exchange treatment, gave a liquid, the pH of which was 4.45 and which contained 2787 P. P. M. $SO_2$, consisting of 2125 P. P. M. free $SO_2$ and 662 P. P. M. combined $SO_2$. This liquid was of very turbid appearance and its strong taste of $SO_2$ rendered it distinctly unpalatable and valueless.

Example I

A portion of the above described brine was filtered and then circulated through the above mentioned resin column until its pH had been reduced to 1.50. The thus treated brine was then boiled for 10 minutes at atmospheric pressure. The pH of the final liquid was now 2.00 and its total $SO_2$ content had decreased to 43 P. P. M. comprising 29 P. P. M. free $SO_2$ and 14 P. P. M. combined $SO_2$. The brine was of clear appearance and had a good palatable, although somewhat tart, cherry flavor.

Example II

A second portion of the above described brine after filtration and subjection to the above described hydrogen ion exchange treatment was blended with one-third its volume of the original untreated brine. This blend, upon boiling for 10 minutes at atmospheric pressure, resulted in a beverage having a pH of 3.10 and a total $SO_2$ content of 72 P. P. M. comprising 43 P. P. M. free $SO_2$ and 29 P. P. M. combined $SO_2$. It was substantially free of turbidity and had an excellent cherry flavor, somewhat less tart than the product prepared in accordance with Example I.

Example III

A third portion of the above described brine was subjected to the same treatment as given in Example II, with the sole difference that it was blended prior to boiling with an equal volume of untreated brine rather than with one-third its volume as in Example II. The final product had a pH of 3.95 and contained 387 P. P. M. of $SO_2$, 301 P. P. M. being free $SO_2$ and 86 P. P. M. being combined $SO_2$. The beverage was slightly turbid in appearance and had a slightly objectionable $SO_2$ taste.

The foregoing description is for purposes of illustration and not of limitation and it is therefore my intention that the invention be limited only by the appended claims or their equivalent wherein I have endeavored to claim broadly all inherent novelty.

I claim:

1. A method of processing the lime sulfur dioxide brine from barrelled cherries for the recovery of the flavor, sugar and organic acid constituents contained therein, which comprises treating said brine with solid, water-insoluble, hydrogen ion exchange material, thereby removing calcium ions and yielding free sulfur dioxide in said brine, and expelling said sulfur dioxide from the thus treated brine.

2. A method according to claim 1 wherein the expulsion of the sulfur dioxide is carried out down to a residual sulfur dioxide content not substantially in excess of 350 P. P. M.

3. A method according to claim 1 wherein the expulsion of the sulfur dioxide is continued until the treated liquid has a pH of substantially 3 to 4.

GORDON B. NICKOL.

REFERENCES CITED

The following references are of record in the file of this patent:

UNITED STATES PATENTS

| Number | Name | Date |
|---|---|---|
| 2,019,030 | Tucker | Oct. 29, 1935 |
| 2,151,883 | Adams | Mar. 29, 1939 |

OTHER REFERENCES

"Demineralizing Solutions" by Tiger et al. Industrial & Eng. Chem. February, 1943, p. 186 to 191.